(12) United States Patent
Dias et al.

(10) Patent No.: US 8,604,131 B2
(45) Date of Patent: Dec. 10, 2013

(54) MOLDED POLYMERIC ARTICLE WITH LOW HAZE AND HIGH CLARITY

(75) Inventors: Peter S. Dias, Missouri City, TX (US); Debra R. Wilson, Missouri City, TX (US); Didem Oner-Deliormanli, Pearland, TX (US); Alena S. Morgan, Lake Jackson, TX (US); Terry W. Glass, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 335 days.

(21) Appl. No.: 12/952,336

(22) Filed: Nov. 23, 2010

(65) Prior Publication Data

US 2011/0124817 A1 May 26, 2011

Related U.S. Application Data

(60) Provisional application No. 61/264,357, filed on Nov. 25, 2009.

(51) Int. Cl.
*C08F 8/00* (2006.01)
*C08L 23/00* (2006.01)
*C08L 23/04* (2006.01)

(52) U.S. Cl.
USPC ............................ 525/240; 525/191; 264/478

(58) Field of Classification Search
USPC ........................................................ 525/240
See application file for complete search history.

(56) References Cited

U.S. PATENT DOCUMENTS

| | | | |
|---|---|---|---|
| 5,026,778 A | | 6/1991 | Fujii et al. |
| 5,237,010 A | * | 8/1993 | Tojo et al. ..................... 525/192 |
| 5,596,042 A | * | 1/1997 | Itoh et al. ......................... 525/98 |
| 5,856,406 A | * | 1/1999 | Silvis et al. .................... 525/240 |
| 6,140,420 A | | 10/2000 | Sehanobish |
| 6,441,094 B1 | | 8/2002 | Cecchin et al. |
| 7,608,668 B2 | | 10/2009 | Shan et al. |
| 2007/0219334 A1 | | 9/2007 | Shan et al. |

FOREIGN PATENT DOCUMENTS

| | | | |
|---|---|---|---|
| JP | 1996225693 | | 9/1996 |
| JP | 10045970 | * | 2/1998 |
| JP | 10077373 | | 3/1998 |
| JP | 2002338761 | | 11/2002 |
| JP | 2004190028 | | 7/2004 |
| WO | 2009114275 | | 9/2009 |
| WO | WO2009/114275 | * | 9/2009 |

OTHER PUBLICATIONS

Engage 8400 flyer, 1996.*

* cited by examiner

*Primary Examiner* — Irina Krylova
(74) *Attorney, Agent, or Firm* — Whyte Hirschboeck Dudek S.C.

(57) ABSTRACT

The present disclosure provides a molded article composed of a polymeric composition and processes for producing the same. The polymeric composition includes from about 60 wt % to about 99 wt % of a matrix of a propylene-based polymer. The propylene-based polymer has a refractive index (n1). The polymeric composition also includes from about 40 wt % to about 1 wt % of elongated elastomer particles dispersed in the propylene-based polymer. The elongated elastomer particles have a refractive index (n2). The propylene-based polymer and the elongated elastomer particles exhibit a refractive index mismatch whereby $|n1-n2|>0.002$. The molded article has a haze value less than about 20% and optionally a viscosity ratio (VR) greater than 0.28.

8 Claims, 4 Drawing Sheets

MOLDED POLYMERIC ARTICLE WITH LOW HAZE AND HIGH CLARITY

CROSS-REFERENCE TO RELATED APPLICATION

This application claims priority to U.S. patent application No. 61/264,357 filed on Nov. 25, 2009, the entire content of which is incorporated by reference herein.

BACKGROUND

The blending of immiscible polymeric materials is known. Polymeric blends are utilized to achieve performance criteria not inherent in the individual polymeric components. Such blending, however, has shortcomings. Blending polymeric materials with different refractive indices, for example, causes the final blend composition to be hazy and/or unclear. Such blends are unsuitable for end applications requiring low haze and/or high clarity.

Accordingly, a need exists for polymeric blends with high clarity and/or low haze that do not require a refractive index match between the individual polymeric components.

SUMMARY

The present disclosure is directed to polymeric blends and molded articles with low haze and/or high clarity and processes for producing same. Molded articles composed of the present polymeric blends exhibit low haze, high clarity, and improved impact strength.

The present disclosure provides a process for producing a molded article. The process includes selecting a propylene-based polymer and an olefin-based elastomer. The propylene-based polymer has a refractive index (n1) as measured in accordance with ASTM D 542 and a melt flow rate (MFR) measured in accordance with ASTM D1238 230° C./2.16 kg. The olefin-based elastomer has a refractive index (n2) and a melt index (MI) measured in accordance with ASTM D 1238 190° C./2.16 kg. The refractive index is measured in accordance with ASTM D 542. The process includes selecting the propylene-based polymer and the olefin-based elastomer such that $$\frac{MI \times 2.8}{MFR} > 0.28 \text{ and } |n1 - n2| > 0.002.$$

The process further includes blending particles of the elastomer into a matrix of the propylene-based polymer, and forming the blend into a molded article having a haze value less than about 20% as measured in accordance with ASTM D 1003.

The present disclosure provides a polymeric composition which includes from about 60 wt % to about 99 wt % of a propylene-based polymer having a refractive index (n1) and an MFR from about 0.5 g/10 min to about 100 g/10 min. The polymeric composition also includes from about 40 wt % to about 1 wt % of olefin-based elastomer particles dispersed in the propylene-based polymer. The olefin-based elastomer has a refractive index (n2) and an MI from about 0.5 g/10 min to about 30 g/10 min. A refractive index mismatch exists between the propylene-based polymer and the olefin-based elastomer, whereby |n1−n2|>0.002. The polymeric composition has haze value less than about 20% as measured in accordance with ASTM D1003. The polymeric composition also has a viscosity ratio (VR)>0.28 wherein $$VR = \frac{MI \times 2.8}{MFR}.$$

The present disclosure provides a molded article. The molded article is composed of a polymeric composition. The polymeric composition includes from about 60 wt % to about 99 wt % of a matrix of a propylene-based polymer. The propylene-based polymer has a refractive index (n1). The polymeric composition also includes from about 40 wt % to about 1 wt % of elongated elastomer particles dispersed in the propylene-based polymer. A refractive index mismatch exists between the propylene-based polymer and the olefin-based elastomer, whereby |n1−n2|>0.002. The molded article has a haze value less than about 20% as measured in accordance with ASTM D 1003.

In an embodiment, the elongated elastomer particles of the molded article have an average length at least 10 times the average particle width from a sectional view taken along a mold flowpath of the article.

An advantage of the present disclosure is a molded article with a low haze value.

An advantage of the present disclosure is a molded article with high clarity.

An advantage of the present disclosure is a molded article with low haze and/or high clarity composed of a polymeric composition, the individual polymeric components of which exhibit a refractive index mismatch.

An advantage of the present disclosure is a molded article of a polymeric blend with improved impact strength and a morphology whereby the discontinuous phase does not scatter light.

An advantage of the present disclosure is a molded article with improved impact strength at both cold temperature and room temperature.

DETAILED DESCRIPTION

Figure 1:
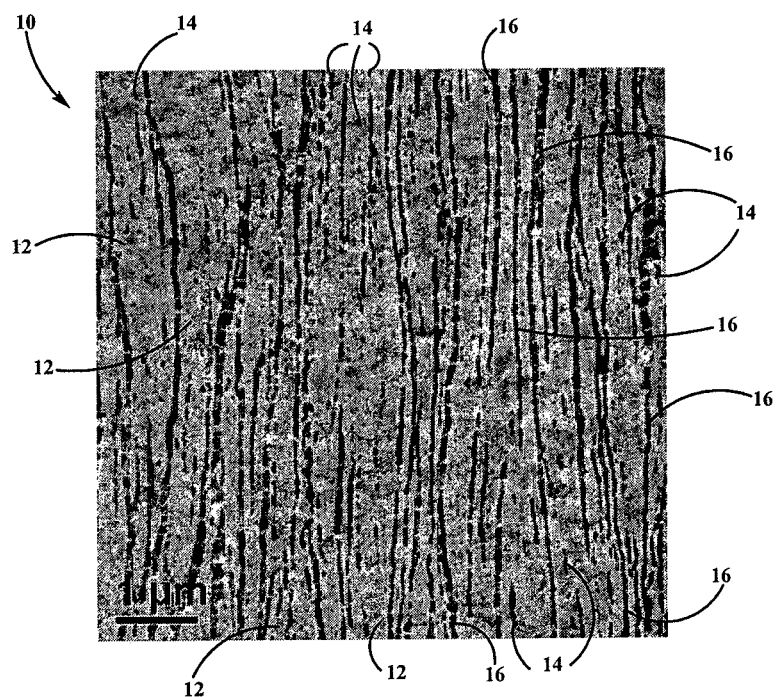
FIG. 1 is a transmission electron miscroscopy (TEM) micrograph of a molded article in accordance with an embodiment of the present disclosure.
Figure 2A:
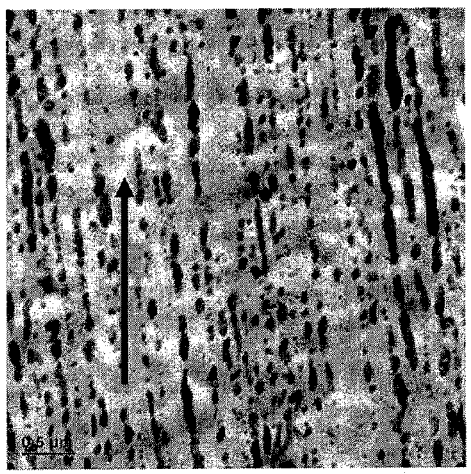
FIGS. 2A-D are TEM micrographs of a molded article in accordance with an embodiment of the present disclosure.
Figure 2B:
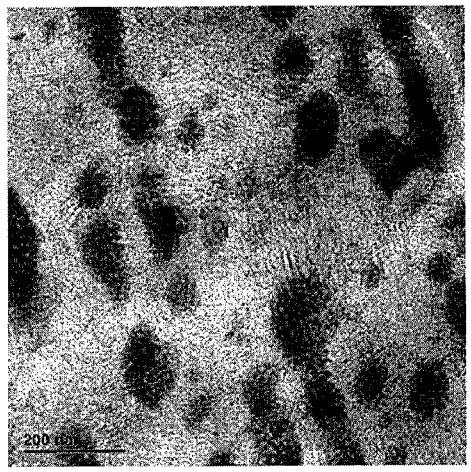
Figure 2C:
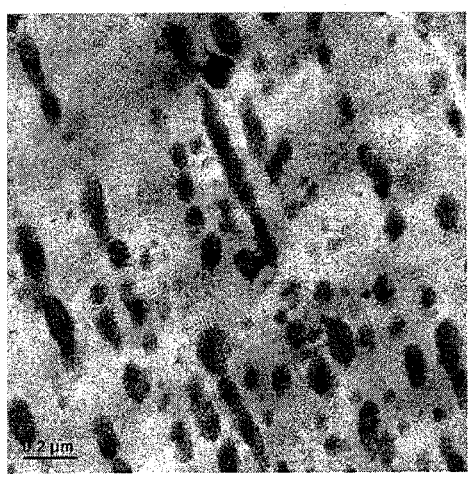
Figure 2D:
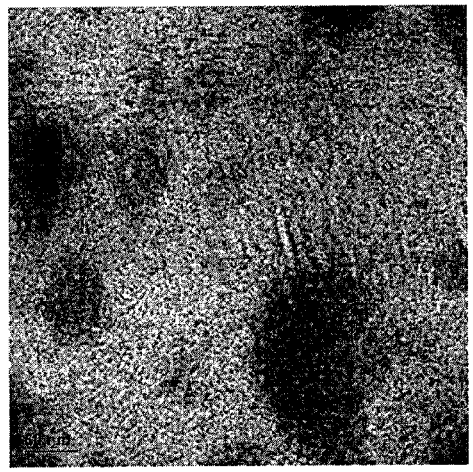

The present disclosure is directed to polymeric blends (and blends of olefin-based polymers in particular) with low haze and/or high clarity and processes for producing the same. The present polymeric blends are suitable for end applications requiring high clarity, low haze, and/or high impact strength. A match (or near match) of refractive index values is not required between the individual polymeric components.

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent U.S. version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt index, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts for components in the composition and/or coating, additives, and various other components in the composition, and the various characteristics and properties by which these components are defined.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometallic compounds. The term, "atom" refers to the smallest constituent of an element regardless of ionic state, that is, whether or not the same bears a charge or partial charge or is bonded to another atom. The term "amorphous" refers to a polymer lacking a crystalline melting point as determined by differential scanning calorimetry (DSC) or equivalent technique.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

"Composition" and like terms mean a mixture or blend of two or more components.

"Blend," "polymer blend" and like terms mean a blend of two or more polymers, as well as blends of polymers with various additives. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "polymer" (and like terms) is a macromolecular compound prepared by reacting (i.e., polymerizing) monomers of the same or different type. "Polymer" includes homopolymers, copolymers, and/or terpolymers.

The present disclosure provides a process. In an embodiment, a process for producing a molded article is provided and includes selecting a propylene-based polymer and an elastomer selection of the propylene-based polymer and the elastomer is based on certain criteria. The process further includes blending particles of the elastomer into a matrix of the propylene-based polymer. The process includes forming the polymeric blend into a molded article having less than about 20% haze.

The process produces a molded polymeric article and includes selecting a propylene-based polymer having a refractive index (n1) and a melt flow rate (MFR) and selecting an olefin-based elastomer having a refractive index (n2) and a melt index (MI). The propylene-based polymer and the olefin-based elastomer are selected such that each of Equation (I) and Equation (II) is fulfilled.

$$\frac{MI \times 2.8}{MFR} > 0.28 \quad \text{(I)}$$

$$|n1 - n2| > 0.002. \quad \text{(II)}$$

MFR for the propylene-based polymer is measured in accordance with ASTM D 1238, condition 230° C./2.16 kg. MI for the olefin-based elastomer is measured in accordance with ASTM D 1238, condition 190° C./2.16 kg. Equation (I) may also be referred to as the viscosity ratio. The "viscosity ratio," or ("VR"), as used herein, is the olefin-based elastomer melt flow divided by the propylene-based polymer melt flow. The viscosity ratio includes a conversion factor to accurately compare the melt flow rate (MFR) for propylene-based polymers and the melt index (MI) for the olefin-based elastomer. When the olefin-based elastomer is a propylene-based polymer (or other type of polymer whereby melt flow is determined by ASTM D 1238 condition 230° C./2.16 kg, then VR requires no "MI-to-MFR" conversion factor and the melt flow of the elastomer is divided by the melt flow of the propylene-based polymer. In an embodiment, the VR is greater than or equal to 0.28 to about 1000, or greater than 0.5 to about 80, or greater than 1.0 to about 7.0 (or any value or subrange therebetween).

The term "|n1−n2|" is the absolute value of the difference between n1 and n2 and may also be denoted by the term "Δn." Values for Δn may be greater than 0.002, or from greater than 0.002 to 0.025. In this sense, Δn denotes a "refractive index mismatch" between the polymeric components of the composition. In an embodiment, the propylene-based polymer and the elastomer are selected such that |n1−n2|>0.008, |n1−n2|>0.010, |n1−n2⊕>0.012, or |n1−n2|>0.015-0.025.

The propylene-based polymer forms a matrix (the continuous phase) in which the olefin-based elastomer is dispersed (the discontinuous phase). It is understood that once the olefin-based elastomer is combined with the propylene-based polymer, the matrix includes or otherwise contains the olefin-based elastomer dispersed therein. It is further understood that elastomers other than olefin-based elastomers are within the scope of the present disclosure.

The term, "propylene-based polymer," as used herein, is a polymer that comprises a majority weight percent polymerized propylene monomer (based on the total amount of polymerizable monomers), and optionally may comprise at least one (or more) polymerized comonomer. Suitable propylene-based polymers include propylene homopolymers, propylene copolymers and propylene interpolymers. The polypropylene homopolymer can be isotactic, syndiotactic or atactic polypropylene. The propylene interpolymer can be a random or block copolymer, or a propylene-based terpolymer. Reactor copolymers of polypropylene may also be used.

In an embodiment, the propylene-based polymer has an MFR from about 0.5 g/10 to about 100 g/10 min. The propylene-based polymer has a density from about 0.85 g/cc to about 0.95 g/cc.

Suitable comonomers for polymerizing with propylene include α-olefins: ethylene (ethylene is hereby considered an α-olefin), 1-butene, 1-pentene, 1-hexene, 1-heptene, 1-octene, 1-nonene, 1-decene, 1-undecene, 1-dodecene; as well as 4-methyl-1-pentene, 4-methyl-1-hexene, 5-methyl-1-hexene, vinylcyclohexane; and styrene. In an embodiment, the comonomers include ethylene, 1-butene, 1-hexene, 1-octene and any combination thereof.

The propylene-based polymer may comprise monomers having at least two double bonds, which are preferably dienes or trienes. Suitable diene and triene comonomers include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5-heptadiene; 1,3-butadiene; 1,6-heptadiene; 1,7-octadiene; 1,8-nonadiene; 1,9-decadiene; 1,10-undecadiene; norbornene; tetracyclododecene; or mixtures thereof; butadiene; hexadienes; octadienes; 1,4-hexadiene; 1,9-decadiene; 4-methyl-1,4-hexadiene; 5-methyl-1,4-hexadiene; dicyclopentadiene; and 5-ethylidene-2-norbornene (ENB).

In an embodiment, the propylene-based polymer is a random propylene/α-olefin copolymer. The random propylene/α-olefin copolymer is a random copolymer of propylene and a minor proportion of one or more α-olefins, a diene, or a mixture or blend of α-olefins. The mixture can be a mechanical blend or an in situ blend.

In an embodiment, the random propylene/α-olefin copolymer includes from about 0.5 wt % to less than about 10 wt % α-olefin copolymer(s).

In an embodiment, the random propylene/α-olefin copolymer is a propylene/ethylene copolymer. The propylene/ethylene copolymer contains from about 0.1 wt % to about 10 wt % units derived from ethylene.

In an embodiment, the random propylene/α-olefin copolymer is a nucleated or a clarified random propylene/α-olefin copolymer. As used herein, "a clarified random propylene/α-olefin copolymer" is a random copolymer of propylene and an α-olefin with a clarifying agent and/or a nucleating agent. The clarifying agent reduces the haze value of the random propylene and α-olefin copolymer (ASTM D 1003) by at least 10%. Thus, a "clarified random propylene/α-olefin copolymer" has a haze value that is at least 10% less than the haze value of the random propylene and α-olefin copolymer without the clarifying agent. In a further embodiment, the clarified random propylene/α-olefin copolymer is a clarified random propylene/ethylene copolymer.

The clarifying agent reduces the size of crystallites, thereby improving the transparency and clarity of articles made from the copolymer. Not wishing to be bound by any particular theory, it is believed that the clarifying agents act as sites for more ordered and faster polyolefin crystallization during cooling. During the process of crystallization, polymer crystals organize into larger superstructures which are referred to as spherulites. The spherulites are more uniform and are smaller in size than spherulites formed in the absence of the clarifying agent. The reduced spherulite size reduces the possibility for light to be scattered. In this way, the clarifying agent improves the optical opacity of the random propylene/α-olefin copolymer. In an embodiment, the clarified random propylene/α-olefin copolymer has a refractive index of about 1.5044 at 589 nm and a haze measurement of about 8.0% or lower.

Nonlimiting examples of suitable clarifying agents and/or nucleating agents include dibenzylidene sorbitol acetal derivatives such as 1,3-O-2,4-bis(3,4-dimethylbenzylidene) sorbitol, available from Milliken Chemical Spartanburg, S.C. under the trade name Millad® 3988, 1,3-O-2,4-bis(p-methylbenzylidene)sorbitol, also available from Milliken Chemical under the trade name Millad® 3940, sodium 2,2'-methylene-bis-(4,6-di-tert-butylphenyl)phosphate (from Asahi Denka Kogyo K. K., known as NA-11), aluminum bis[2,2'-methylene-bis-(4,6-di-tert-butylphenyl)phosphate] (also from Asahi Denka Kogyo K. K., known as NA-21), sodium benzoate, or other nucleators, particularly those which provide extremely quick crystal formation and/or arrangement. The clarified random propylene/α-olefin copolymer may include optional additives such as plasticizers, antistatic agents, antioxidants, stabilizers, acid neutralizers, and ultraviolet absorbers.

In an embodiment, the clarified random propylene/α-olefin copolymer is made with a Ziegler-Natta catalyst and is available from The Dow Chemical Company of Midland, Mich. under the designation Dow 6D83K Polypropylene Resin. Dow 6D83K is a clarified random propylene/ethylene copolymer and contains about 3 percent, or 3.2 percent by weight units derived from ethylene and has a melt flow rate of about 1.9 g/10 min. This clarified random propylene-ethylene copolymer exhibits a heat of fusion of approximately 93 Joules/gram, a molecular weight distribution (Mw/Mn) of about 4.5 and a melting point of about 145° C.

The polymeric blends of the present disclosure include an elastomer. An "elastomer," as used herein, is a rubber-like polymer which can be stretched to at least twice its original length and which retracts substantially to its original length when the force exerting the stretching is released. An elastomer has a low initial modulus an elastic modulus of about 10,000 psi (68.95 MPa) or less and an elongation usually greater than 200% in the uncrosslinked state at room temperature using the method of ASTM D638.

Nonlimiting examples of suitable elastomers include: olefin-based elastomers (i.e., propylene-based elastomers and/or ethylene-based elastomers), polyamide elastomers, elastomeric polyesters, isobutylene polymers, polyurethane elastomers, acrylic elastomers, natural rubber, polybutadiene, polyisoprene, a styrene-based, hydrogenated block copolymer, and any combination of the foregoing. A styrene-based, hydrogenated block copolymer rubber has a structure containing a segment A having a polystyrene structure at 1 to 25% by weight, A-B or A-B-A wherein, A is a segment of polystyrene structure, and B is a segment of ethylene/butene or ethylene/propylene structure.

In an embodiment, the olefin-based elastomer is an ethylene-based elastomer. The term, "ethylene-based elastomer," as used herein, is a polymer that comprises a majority weight percent polymerized ethylene monomer (based on the total weight of polymerizable monomers), and optionally may comprise at least one (or more) polymerized comonomer, the ethylene-based polymer having the properties of an elastomer as defined above. Nonlimiting examples of suitable ethylene-based elastomers include ethylene/α-olefin copolymers such as ethylene and $C_3$-$C_8$ α-olefin comonomer (ethylene/propylene copolymer, ethylene/butene copolymer, ethylene/hexene copolymer, and/or ethylene/octene copolymer), and/or olefin block copolymer (OBC).

Olefin-block copolymer (OBC) is a multi-block copolymer containing alternating semicrystalline and amorphous segments, achieved by varying the ratio of α-olefin to ethylene in the two types of blocks. OBCs are produced with a catalytic system utilizing a chain shuttling agent to transfer growing chains between two distinct catalysts with different monomer selectivities in a single polymerization reactor. OBCs are available under the INFUSE mark, available from The Dow Chemical Company, Midland, Mich.

The term "multi-block copolymer" is a polymer comprising two or more chemically distinct regions or segments (also referred to as "blocks") joined in a linear manner, that is, a polymer comprising chemically differentiated units which are joined end-to-end with respect to polymerized ethylenic functionality, rather than in pendent or grafted fashion. The blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers can be ethylene/α-olefin multi-block copolymer or propylene/α-olefin multi-block copolymer and are characterized by (a) a molecular fraction that elutes between about 40° C. and about 130° C. when fractionated using temperature rising effluent fractionation (TREF), characterized in that the fraction has a block index of at least 0.5 and up to 1 and a molecular weight distribution (PDI, Mw/Mn, MWD) greater than 1.3, or (b) an average block index greater than zero and up to 1.0 and an MWD greater than 1.3. In addition, the ethylene multi-block interpolymer typically has at least one of the following properties: (i) a molecular weight distribution of greater than 1.3, (ii) a density of less than 0.90 g/cc, (iii) a 2% secant modulus of less than 150 megaPascal (mPa) as measured by ASTM D-882-02, (iv) a melt point of less than 125° C., (v) an α-olefin content of at least 10 and less than 80 wt % based on the weight of the interpolymer, (vi) a Tg of less than −35° C., and (vii) a melt index (MI) of less than 100 grams per 10 minutes (g/10 min). Multi-block copolymer is disclosed in U.S. patent application Ser. No. 11/376,835 filed on Mar. 15, 2006, the entire content of which is incorporated herein by reference. Propylene/α-olefin multi-block copolymer is disclosed in U.S. patent application Ser. No. 11/686,444 filed on Mar. 15, 2007, the entire content of which is incorporated by reference herein.

In an embodiment, the olefin-based elastomer is an ethylene-based elastomer and has a melt index (or a melt flow rate) from about 0.5 g/10 min to about 30 g/10 min. The ethylene-based elastomer has a density from about 0.85 g/cc to about 0.91 g/cc, or from about 0.86 g/cc to about 0.888 g/cc. In a further embodiment, the ethylene-based elastomer has a density less than 0.885 g/cc or less than 0.880 g/cc.

The process includes blending or otherwise dispersing particles of the ethylene-based elastomer into a matrix of the propylene-based polymer. The propylene-based polymer and the elastomer may be combined by way of dry blending and/or melt blending.

The process includes forming the polymeric blend (i.e., the elastomer particles dispersed in the propylene-based polymer matrix) into a molded article. Molding may occur by way of injection molding, compression molding, and/or extrusion molding. It is understood that molding does not include thermosetting and/or thermoforming. During the molding procedure, the polymeric blend is heated to at least the glass transition temperature of the matrix phase (i.e., the propylene-based polymer). The term "glass transition temperature," as used herein, is the temperature at which a polymer changes from a brittle state or a vitreous state to a plastic state.

Flow forces and/or shear forces stretch or otherwise strain the molten elastomer particles as the polymeric blend moves through the mold die. The forces during molding strain the elastomer particles to an entropically disfavored state. In this strained state, the elastomer particles exhibit an elongated and/or rod-shaped morphology. The process further includes crystallizing the matrix phase before the elongated particles of elastomer return to an un-stretched, non-elongated, or otherwise thermodynamically favorable state. In other words, the matrix phase is crystallized before the elongated elastomer particles cool, thereby immobilizing or otherwise freezing the elongated elastomeric particles in their entropically disfavored state. In an embodiment, the process includes cooling the molded article and preventing strain recovery of the elongated elastomer particles.

An "elongated elastomer particle," as used herein, is an elastomer present in a molded article as a discontinuous phase dispersed within a continuous phase, the elongated elastomer particle having an average length that is greater than the average particle width. In an embodiment, the average length of the elongated elastomer particle is at least 10, or at least 50, or at least 100 times the average particle width from a sectional view of the molded article taken along an axis extending through the flowpath. The "flowpath" or "mold flowpath" is the direction of travel of the plastic polymeric blend through the mold. The length and width of the elongated elastomer particle is determined by way of transmission electron microscopy (TEM). The elongated elastomer particles are parallel to, or substantially parallel to, the flowpath. The elongated elastomer particles advantageously do not interfere with the transmission of the light traveling (i.e., do not scatter light) through the article thereby improving clarity and reducing haze of the molded article.

Bounded by no particular theory, the Applicants surprisingly discovered that preparing a polymeric blend in accordance with Equation (I) and subsequently molding the polymeric blend unexpectedly enables the matrix phase to freeze or otherwise immobilize the molten elastomer particles in their elongated configuration and entropically disfavored state. Molding blend components that fulfill the viscosity ratio criteria of Equation (I) surprisingly yields molded articles with low haze and/or high clarity. The present process further unexpectedly yields molded articles with high impact strength and excellent low temperature impact strength in particular.

In an embodiment, the process produces a molded article with a haze less than 20%, or less than 15%, or less than 10%, or less than 8%.

In an embodiment, the process produces a molded article with a clarity greater than 90%, or greater than 95%, or greater than 98%, or greater than 99%, or from about 99% to about 99.9%.

In an embodiment, the present process produces a molded article with improved impact strength. A molded article with greater than 10 wt % elastomer (and less than 90 wt % propylene-based polymer) exhibits an impact strength that is at least two times greater than the impact strength of a molded article made solely from the propylene-based polymer. Impact strength is measured in accordance with ASTM D 5420GC.

FIG. 1 is a TEM micrograph of a molded article 10 composed of a polymeric blend and produced by the present process. FIG. 1 is a sectional view taken along the mold flowpath. Molded article 10 includes a continuous phase 12 and a discontinuous phase 14 dispersed in the continuous phase 12. A plurality of elongated elastomer particles 16 are dispersed throughout the continuous phase 12.

In an embodiment, from about 30 wt % to about 80 wt %, or from about 40 wt % to about 70 wt %, or from about 50 wt % to about 60 wt % of the total weight of the discontinuous phase (i.e., the elastomer) is composed of elongated elastomer particles.

In an embodiment, the process includes subjecting the polymeric blend to a shear rate from about 8,000 sec$^{-1}$ to about 12,000 sec$^{-1}$ during the molding procedure. "Shear rate" is the rate at which a shear stress is applied to a molten material. A "shear stress" is a stress which is applied parallel to and/or tangential to a material. In contrast, normal stress is applied perpendicular to a material. It has been discovered that subjecting the polymeric blend to this shear rate surprisingly increases the stretch of the elastomer particles to further extend the length of the elongated elastomer particles present in the molded article.

The unforeseen ability to immobilize the elongated elastomer particles by way of the present process advantageously permits the production of high clarity and/or low haze molded products from a greater variety of individual components. It is known that blending polymeric compositions having the same, or similar, refractive indices contributes to clarity in the finished article. The present process expands the selection of polymeric components suitable for high clarity and/or low haze end applications to include components with dissimilar refractive indices, i.e., polymeric components with a refractive index mismatch.

In an embodiment, the refractive index (n1) for the propylene-based polymer is from about 1.495 to about 1.505. The refractive index (n2) for the olefin-based elastomer is from about 1.470 to about 1.497.

Applicants have surprisingly discovered that a polymeric blend with a VR greater than 0.28 enables polymeric materials with a Δn>0.002 to be used to produce molded articles with a haze less than about 20% and/or a clarity greater than 95%.

The present process may comprise two or more embodiments disclosed herein.

The present disclosure includes a polymeric composition. In an embodiment, a polymeric composition is provided and includes from about 60 wt % to about 99 wt %, or from about 70 wt % to about 90 wt %, or from about 80 wt % to about 89 wt % of a propylene-based polymer having a refractive index (n1) and a MFR from about 0.5 g/10 min to about 100 g/10 min. The polymeric composition also includes from about 40 wt % to about 1 wt %, or from about 30 wt % to about 10 wt %, or from about 20 wt % to about 11 wt % of olefin-based elastomer particles dispersed in the propylene-based polymer. The olefin-based elastomer has a refractive index (n2) and a melt index (MI). Weight percent is based on the total weight of the polymeric composition. The olefin-based elastomer has an MI from about 0.5 g/10 min to about 30 g/10 min. The refractive indices for components fulfill Equation (II).

$$|n1-n2|>0.002 \tag{II}$$

The polymeric composition has haze value less than about 20% as measured in accordance with ASTM D 1003. The polymeric composition also has a viscosity ratio (VR) greater than 0.28 wherein $$VR = \frac{MI \times 2.8}{MFR} \tag{III}$$

In an embodiment, the Δn value (the refractive index mismatch) for the components of the polymeric composition is greater than or equal to 0.015.

In an embodiment, propylene-based polymer has an n1 value from about 1.495 to about 1.505 and the elastomer has an n2 value from about 1.470 to about 1.497.

In an embodiment, the polymeric composition includes a random propylene copolymer and/or a propylene homopolymer. The olefin-based elastomer is selected from an ethylene/butene copolymer, ethylene/hexane copolymer, an ethylene/octene copolymer and/or OBC. The polymeric composition has a VR greater than 0.8. The Δn value is greater than 0.002. The polymeric composition has a haze value less than about 10%, or less than about 7%.

In an embodiment, the polymeric composition includes a propylene homopolymer and/or a random propylene copolymer. The olefin-based elastomer is selected from an ethylene/butene copolymer, ethylene/hexane copolymer, ethylene/octene copolymer and/or OBC. The Δn value is greater than 0.002. The polymeric composition has a VR greater than 2.0. The polymeric composition has a haze value less than about 10%, or less than about 8%.

In an embodiment, the elastomer is an ethylene/$C_4$-$C_{10}$ α-olefin copolymer having a density from about 0.860 g/cc to less than about 0.888 g/cc.

The present disclosure provides a molded article. A "molded article," as used herein, is a rigid article composed of a polymeric composition that has been subjected to an injection molding process, a compression molding process, and/or an extrusion molding process. Articles such as fibers, foams and oriented films are not rigid and are not molded articles.

In an embodiment, a molded article is provided and includes a polymeric composition. The polymeric composition may be any polymeric composition disclosed herein. The molded article may be an injection molded article, a compression molded article, or an extrusion molded article. It is understood that each of the foregoing molded articles embodies physical properties unique to the molding process from which it was produced. The polymeric composition includes from about 60 wt % to about 99 wt % of a matrix composed of a propylene-based polymer. The polymeric composition also includes from about 40 wt % to about 1 wt % of elongated elastomer particles dispersed in the matrix. The elongated elastomer particles have an average length at least 10 times the average particle width from a sectional view taken along an axis extending through the mold flowpath. The molded article has a haze value less than about 20%, or less than 15%, or less than 10%, or less than 8% as measured in accordance with ASTM D 1003.

In an embodiment, the molded article has a clarity greater than 90%, or greater than 95%, or from about 98%, or greater than 99%, or from about 99% to about 99.9%.

In an embodiment, the elongated elastomer particles have an average width from about 5 nm to about 200 nm, or from about 10 to about 100 nm, or from about 15 to about 50 nm.

In an embodiment, the discontinuous phase of the molded article includes from about 30 wt % to about 70 wt % of elongated elastomer particles (based on the total weight of the discontinuous phase).

In an embodiment, the molded article has a viscosity VR greater than 0.02, or greater than 0.28, or greater than about 4.0 or greater than about 7.0.

In an embodiment, the Δn value for the components of the molded article is greater than 0.002, or greater than 0.01, or greater than or equal to 0.015.

The propylene-based polymer may be any propylene-based polymer disclosed herein. In an embodiment, the propylene-based polymer is a clarified random propylene/α-olefin copolymer, such as clarified random propylene-ethylene copolymer, for example.

The elastomer may be any elastomer disclosed herein. In an embodiment, the elastomer is an ethylene-based elastomer such as an ethylene/$C_4$-$C_{10}$ α-olefin, ethylene/butene copolymer, ethylene/hexene copolymer, ethylene/octene copolymer, and/or OBC.

In an embodiment, the article is an injection molded article. The polymeric blend subjected to injection molding exhibits unique morphology. Bounded by no particular theory, it is believed that shear forces imparted upon the polymeric blend during injection molding produce the elongated elastomer particles as previously disclosed herein.

In an embodiment, the molded article is not oriented.

In an embodiment, the injection molded article is a film, a container (cup, tray, pail, tub), and/or tubing.

In an embodiment, the molded article has a thickness less than about 60 mil, or less than about 50 mil, or less than about 30 mil.

The polymeric composition and/or the molded article may include one or more additives. Nonlimiting examples of suitable additives include antioxidant, neutralizing agent, antiweathering agent modifier, antifoaming agent, dispersant, antistatic agent, lubricant, molecular weight regulator, heat stabilizer, photostabilizer, ultraviolet absorber, lubricant, antifog agent, antiblocking agent, lubricant, flame retardant, electrical conductivity-imparting agent, crosslinking agent, crosslinking auxiliary agent, metal inactivator, fungicide, fluorescent whitener or other various auxiliary agent, filler, colorant, and any combination of the foregoing.

The molded article may comprise two or more embodiments disclosed herein.

Nonlimiting examples of suitable embodiments are provided below.

A process (E1) comprising selecting a propylene-based polymer having a refractive index (n1) as measured in accordance with ASTM D 542 and a melt flow rate (MFR) measured in accordance with ASTM D 1238 230° C./2.16 kg and an olefin-based elastomer having a refractive index (n2) as measured in accordance with ASTM D 542 and a melt index (MI) measured in accordance with ASTM D 1238 190° C./2.16 kg, such that $$\frac{MI \times 2.8}{MFR} > 0.28 \text{ and } |n1 - n2| > 0.002;$$

The process (E1) includes blending particles of the elastomer into a matrix of the propylene-based polymer; and forming the blend into a molded article having a haze value less than about 20% as measured in accordance with ASTM D 1003.

E2. The process of E1 comprising forming the olefin-based elastomer into elongated elastomer particles having an average length at least 10 times the average particle width; and immobilizing the elongated elastomer particles in the matrix. E3. A process of any of E1-E2 comprising heating the matrix to at least the melting temperature of the matrix and cooling the matrix to an immobile state before retraction of the elongated elastomer particles. E4. The process of any of E1-E3 comprising subjecting the molten blend to a shear rate from about 8,000 $sec^{-1}$ to about 12,000 $sec^{-1}$. E5. The process any of E1-E4 wherein the forming is injection molding.

A polymeric composition (E6) is provided and comprises from about 60 wt % to about 99 wt % of a propylene-based polymer having a refractive index (n1) as measured in accordance with ASTM D 542 and a melt flow rate (MFR) from about 0.5 g/10 min to about 100 g/10 min as measured in accordance with ASTM D 1238, 230° C./2.16 kg; from about 40 wt % to about 1 wt % of olefin-based elastomer particles dispersed in the propylene-based polymer, the olefin-based elastomer having a refractive index (n2) as measured in accordance with ASTM D 542 and a melt index (MI) from about 0.5 g/10 min to about 30 g/10 min as measured in accordance with ASTM D 1238, 190° C./2.16 kg; wherein |n1−n2|>0.002; and the polymeric composition (E6) has haze value less than about 20% as measured in accordance with ASTM D 1003, and a viscosity ratio (VR)>0.28 wherein $$VR = \frac{MI \times 2.8}{MFR}.$$

E7. The polymeric composition of E6 wherein the propylene-based polymer is selected from the group consisting of propylene homopolymer and random propylene/α-olefin copolymer. E8. The polymeric composition of any of E6-E7 wherein the olefin-based elastomer is selected from the group consisting of an ethylene/$C_4$-$C_{10}$ α-olefin copolymer and an olefin-block copolymer. E9. The polymeric composition of any of E6-E8 comprising a random propylene/ethylene copolymer and an olefin-based elastomer selected from the group consisting of an ethylene/butene copolymer, ethylene/hexene copolymer, and an ethylene/octene copolymer, and VR is greater than 0.8 and the haze value is less than about 10%. E10. The polymeric composition of any of E6-E9 comprising a random propylene/ethylene copolymer and an olefin-based elastomer selected from the group consisting of an ethylene/butene copolymer, an ethylene/hexene copolymer, and an ethylene/octene copolymer, and VR is greater than 2.0 and the haze value is less than about 10%. E11. The polymeric composition of E10 wherein the propylene-based polymer has an n1 value from about 1.495 to about 1.505 and the ethylene-based elastomer has an n2 value from about 1.470 to about 1.497.

A molded article (E12) is provided and comprises a polymeric composition comprising from about 60 wt % to about 99 wt % a matrix of a propylene-based polymer with a refractive index (n1); from about 40 wt % to about 1 wt % of elongated elastomer particles with a refractive index (n2) dispersed on the propylene-based polymer; wherein |n1'n2|>0.002, and the molded article has a haze value less than about 20% as measured in accordance with ASTM D 1003. E13. The molded article of E12 wherein the elongated elastomer particles have an average length at least 10 times the average particle width from a sectional view taken along a mold flowpath of the article. E14. The molded article of E12 wherein the elongated elastomer particles have an average width from about 5 nm to about 200. E15. The molded article of any of E12-E14 wherein the propylene-based polymer has a melt flow rate (MFR) measured in accordance with ASTM D 1238, 230° C./2.16 kg, and the elongated elastomer particles comprise an ethylene-based elastomer having a melt index (MI) measured in accordance with ASTM D1238, 190° C./2.16 kg, the molded article having a viscosity ratio (VR) >0.28 wherein $$VR = \frac{MI \times 2.8}{MFR}$$

E16. The molded article of any of E12-E15 wherein the molded article is an injection molded article. E17. The molded article of any of E12-E16 wherein the propylene-based polymer is a nucleated random propylene/ethylene copolymer. E18. The molded article of any of E12-E17 wherein the elongated elastomer particles comprise a member selected from the group consisting of ethylene/butene copolymer, ethylene/hexene copolymer, ethylene/octene copolymer, and combinations thereof. E19. The molded article of any of E12-E18 having a haze less than 10%. E20. The molded article of any of E12-E19 having a clarity value greater than or equal to 98% as measured in accordance with ASTM D 1746.

Test Methods

Clarity is determined in accordance with ASTM D 1746 on plaques with the following dimensions: 0.5 mm×60 mm×60 mm.

Density is measured in accordance with ASTM D 792 Method B.

Flexural modulus is measured in accordance with ASTM D 790 with flex speed of 0.05 in/min using injection molded type 1 tensile bars: ⅛ inch×½ inch×6' inch.

Gardner impact strength is measured in accordance with ASTM D 5420GC at 32° F. and −20° F. using standard ring in method with a 4 lb hammer on plaques with the following dimensions: 0.5 mm×60 mm×60 mm.

Haze is determined in accordance with ASTM D 1003 on plaques with the following dimensions: 0.5 mm×60 mm×60 mm.

Notched izod impact strength is measured in accordance with ASTM D 256A using notched injection molded bars at 23° C.

Melt flow rate (MFR) in g/10 min for propylene-based polymers is measured using ASTM D 1238, condition 230° C./2.16 kg.

Melt index (I2) in g/10 min for ethylene-based polymers is measured using ASTM D 1238. Condition 190° C./2.16 kg.

Refractive index (n) is measured in accordance with ASTM D 542.

By way of example, and not by limitation, examples of the present disclosure are provided.

EXAMPLES

A. Preparation of Molded Articles

Propylene-based polymer and elastomer are dry blended and are injection molded into molded articles using an 85 ton Cincinnati Milacron Elektra injection molding machine under the conditions set forth in Table 1 below.

TABLE 1

| Process Conditions | |
|---|---|
| Melt temp. ° F. | 425 |
| Mold temp. ° F. | 100 |
| Screw stroke, in | 0.9 |
| Screw rpm | 175 |
| Back pressure, psi | 1000 |
| Pack pressure, psi | 5000 |
| Hold pressure, psi | 4000 |
| Injection high time, sec | 1.3 |
| Pack time, sec | 2 |
| Hold time, sec | 5 |
| Cooling time, sec | 20 |
| Shot size, in | 1.5 |
| Injection speed, in/sec | 2.5 |
| Cycle time, sec | 34 |

The Comparative Samples 4-8 and the Examples are injection molded into a 0.5 mm plaque to simulate injection molding into a thin-walled container. The Examples are unexpectedly clear. The propylene-based polymers (matrix) are Dow 6D83K, Dow 751-12, and Dow 7021-50RNA. All three of these propylene-based polymers are random propylene copolymers (RCP) with 3% (wt.) ethylene comonomer.

Comparative Samples

Comparative Samples 1 through 3. The comparative samples are produced from conventional extrusion processes using the similar materials as Example 2 and Example 3. These specimens are very hazy, and not at all clear. This is because the mismatch in refractive index causes the particles to scatter light.

Table 2. Comparative Samples 1-3. All specimens have components with a significant mis-match in refractive index, but they are not clear. Haze values are very high, and clarity is low. Comparative Sample 1 is compounded in a twin-screw extruder prior to being compression molded. Comparative Sample 2 is compounded in a twin-screw extruder prior to being extruded into sheet. Comparative Sample 3 is compounded in a twin-screw extruder prior to being mixed under high shear with a Maddox mixer and then extruded into sheet.

TABLE 2

| Comparative Samples | Polypropylene | | | Modifier | | | | | Modifier Load (Wt %) | Δn × 10⁻³ | 0.5 mm Clarity (%) | 0.5 mm Haze (%) |
|---|---|---|---|---|---|---|---|---|---|---|---|---|
| | Grade | MFR (dg/min) | n | Grade | Density (g/cc) | MI (dg/min) | n | Viscosity Ratio | | | | |
| 1 6D83K/15% Engage 8200 | 6D83K | 2 | 1.5 | ENGAGE™ 8200 | 0.87 | 1 | 1.485 | 1.4 | 15 | 15 | 0 ± 0 | 81 ± 3 |

TABLE 2-continued

| Comparative Samples | Polypropylene | | | Modifier | | | | Modifier | | | |
| --- | --- | --- | --- | --- | --- | --- | --- | --- | --- | --- | --- |
| | Grade | MFR (dg/min) | n | Grade | Density (g/cc) | MI (dg/min) | n | Viscosity Ratio | Load (Wt %) | Δn × 10⁻³ | 0.5 mm Clarity (%) | 0.5 mm Haze (%) |
| 2 6D83K/20% Engage 8400 | 6D83K | 2 | 1.5 | ENGAGE™ 8407 | 0.87 | 30 | 1.485 | 42.0 | 20 | 15 | 16.4 ± 0.4 | 24.8 ± 0.5 |
| 3 6D83K/15% Engage 8200 | 6D83K | 2 | 1.5 | ENGAGE™ 8200 | 0.87 | 5 | 1.485 | 7.0 | 15 | 15 | 26.52 ± 0.0 | 18.3 ± 0.4 |

Comparative Samples 4 through 8. These Comparative Samples are made using the exact same die and process conditions as the Examples. However, elastomer viscosities are higher than the random propylene copolymer viscosity. This results in spherical particles that scatter light. These specimens are very hazy, and not at all clear.

Table 3. Comparative Samples 4-8. Each Comparative Sample 4-8 has components with a significant mis-match in refractive index, but they are not clear. Haze values are very high, and clarity is low. All samples are injection molded under the same conditions as the Examples. However, these specimens have elastomer viscosities that are greater than the random propylene copolymer viscosities.

TABLE 3

| Comparative Samples | Polypropylene | | | Modifier | | | | Viscosity Ratio | Modifier Load (Wt %) | Δn × 10⁻³ | 0.5 mm Clarity (%) | 0.5 mm Haze (%) |
| --- | --- | --- | --- | --- | --- | --- | --- | --- | --- | --- | --- | --- |
| | Grade | MFR (dg/min) | n | Grade | Density (g/cc) | MI (dg/min) | n | | | | | |
| 4 6D83K/20% Engage 7387 | 6D83K | 2 | 1.5 | ENGAGE™ 7387 | 0.87 | 0.3 | 1.4852 | 0.4 | 20 | 15 | 92.9 ± 0.5 | 35.2 ± 0.5 |
| 5 R751-12N/20% Engage 8842 | R751-12N | 12 | 1.5 | ENGAGE™ 8842 | 0.857 | 1 | 1.4762 | 0.2 | 20 | 24 | 92.1 ± 0.5 | 45.0 ± 0.8 |
| 6 R7021.50/15% Engage 8200 | R7021-50 RNA | 50 | 1.5 | ENGAGE™ 8200 | 0.87 | 5 | 1.4851 | 0.3 | 15 | 15 | 96.2 ± 0.3 | 17.3 ± 0.4 |
| 7 R7021.5/20% Engage 8100 | R7021-50 RNA | 50 | 1.5 | ENGAGE™ 8100 | 0.87 | 1 | 1.4852 | 0.1 | 20 | 15 | 47 ± 1 | 55.3 ± 0.7 |
| 8 R7021.50/15% Engage 7447 | R7021-50 RNA | 50 | 1.5 | ENGAGE™ 7447 | 0.865 | 5 | 1.4821 | 0.3 | 15 | 18 | 95.9 ± 0.2 | 25.0 ± 0.3 |

Table 4. Examples 1-16. All specimens have components with a significant mis-match in refractive index while maintaining excellent clarity and very low haze. These examples are all injection molded. The elastomer viscosities are lower than the polypropylene viscosities.

TABLE 4

| Examples | Polypropylene | | | Modifier | | | | Viscosity Ratio | Modifier Load (Wt %) | Δn × 10⁻³ | 0.5 mm Clarity (%) | 0.5 mm Haze (%) |
| --- | --- | --- | --- | --- | --- | --- | --- | --- | --- | --- | --- | --- |
| | Grade | MFR (dg/min) | n | Grade | Density (g/cc) | MI (dg/min) | n | | | | | |
| 1 6D83K/20% Engage 8003 | 6D83K | 2 | 1.5 | ENGAGE™ 8003 | 0.885 | 1 | 1.496 | 1.4 | 20 | 4 | 98.1 ± 0.2 | 9.4 ± 0.3 |
| 2 6D83K/20% Engage 8400 | 6D83K | 2 | 1.5 | ENGAGE™ 8400 | 0.870 | 30 | 1.485 | 42.0 | 20 | 15 | 98.7 ± 0.4 | 10.4 ± 0.5 |
| 3 6D83K/15% Engage 8200 | 6D83K | 2 | 1.5 | ENGAGE™ 8200 | 0.870 | 5 | 1.485 | 7.0 | 15 | 15 | 99.2 ± 0.0 | 8.3 ± 0.2 |
| 4 6D83K/20% Engage 8100 | 6D83K | 2 | 1.5 | ENGAGE™ 8100 | 0.870 | 1 | 1.485 | 1.4 | 20 | 15 | 98.2 ± 0.1 | 13.2 ± 0.4 |
| 5 6D83K/15% Engage 7447 | 6D83K | 2 | 1.5 | ENGAGE™ 7447 | 0.865 | 5 | 1.482 | 7.0 | 15 | 18 | 98.8 ± 0.2 | 13.5 ± 0.7 |
| 7 R751-12N/20% Engage 8411 | R751-12N | 12 | 1.5 | ENGAGE™ 8411 | 0.880 | 18 | 1.492 | 4.2 | 20 | 8 | 99.4 ± 0.2 | 6.9 ± 0.4 |

TABLE 4-continued

| | | Polypropylene | | | Modifier | | | | | | | |
|---|---|---|---|---|---|---|---|---|---|---|---|---|
| Examples | Grade | MFR (dg/min) | n | Grade | Density (g/cc) | MI (dg/min) | n | Viscosity Ratio | Modifier Load (Wt %) | Δn × $10^{-3}$ | 0.5 mm Clarity (%) | 0.5 mm Haze (%) |
| 8 R751-12N/10% Engage 8130 | R751-12N | 12 | 1.5 | ENGAGE ™ 8130 | 0.864 | 13 | 1.481 | 3.0 | 10 | 19 | 99.4 ± 0.1 | 7.7 ± 0.6 |
| 9 R751-12N/10% Engage 8200 | R751-12N | 12 | 1.5 | ENGAGE ™ 8200 | 0.870 | 5 | 1.485 | 1.2 | 10 | 15 | 99.2 ± 0.1 | 9.2 ± 0.2 |
| 10 R751-12N/20% Engage 8200 | R751-12N | 12 | 1.5 | ENGAGE ™ 8200 | 0.870 | 5 | 1.485 | 1.2 | 20 | 15 | 99.1 ± 0.2 | 11.0 ± 0.5 |
| 11 R751-12N/20% Engage 8401 | R751-12N | 12 | 1.5 | ENGAGE ™ 8401 | 0.885 | 30 | 1.496 | 7.0 | 20 | 4 | 99.5 ± 0.0 | 6.1 ± 0.2 |
| 12 R7021.50/20% Engage 8401 | R7021-50 RNA | 50 | 1.5 | ENGAGE ™ 8401 | 0.885 | 30 | 1.496 | 1.7 | 20 | 4 | 99.3 ± 0.3 | 6.2 ± 0.3 |
| 13 R7021.50/15% Engage 8407 | R7021-50 RNA | 50 | 1.5 | ENGAGE ™ 8407 | 0.870 | 30 | 1.485 | 1.7 | 15 | 15 | 99.5 ± 0.1 | 9.6 ± 0.2 |
| 14 R7021.50/15% Engage 8411 | R7021-50 RNA | 50 | 1.5 | ENGAGE ™ 8411 | 0.880 | 18 | 1.492 | 1.0 | 15 | 8 | 99.4 ± 0.1 | 8.7 ± 0.2 |
| 15 R7021.50/20% Engage 8411 | R7021-50 RNA | 50 | 1.5 | ENGAGE ™ 8411 | 0.880 | 18 | 1.492 | 1.0 | 20 | 8 | 98.8 ± 0.1 | 9.2 ± 0.1 |
| 16 R7021.50/10% Engage 8130 | R7021-50 RNA | 50 | 1.5 | ENGAGE ™ 8130 | 0.864 | 13 | 1.481 | 0.7 | 10 | 19 | 99.3 ± 0.1 | 13.0 ± 0.1 |

Example 17 in Table 5 below is an example of a molded article composed of a polypropylene (matrix) and a propylene-based elastomer (Versify 3401).

TABLE 5

| | | Polypropylene | | | Modifier | | | | Modifier | | 0.5 mm | 0.5 mm |
|---|---|---|---|---|---|---|---|---|---|---|---|---|
| Example | Grade | MFR (dg/min) | n | Grade | Density (g/cc) | MFR (dg/min) | n | Viscosity Ratio | Load (Wt %) | Δn × $10^{-3}$ | Clarity (%) | Haze (%) |
| 17 6D83K/15% Versify 3401 | 6D83K | 2 | 1.5 | VERSIFY ™ 3401 | 0.864 | 8 | 1.482 | 4.0 | 15 | 18 | 98.2 ± 0.1 | 7.7 ± 0.1 |

Table 6 below shows impact properties for several examples of the present molded article.

TABLE 6

| | | Polypropylene | | | Modifier | | | | | | Gardner | |
|---|---|---|---|---|---|---|---|---|---|---|---|---|
| Example | Grade | MFR (dg/min) | n | Grade | Density (g/cc) | MI (dg/min) | n | Viscosity Ratio | Modifier Load (Wt %) | Δn × $10^{-3}$ | Impact, 32° F. (inch-lbs) | Gardner Impact, −20° F. (inch-lbs) |
| Polypropylene Control | 6D83K | 2 | 1.5 | — | — | — | — | — | — | — | 2.0 ± 0.2 | 2.0 ± 0.2 |
| 6D83K/20% Engage 8003 (Ex 1) | 6D83K | 2 | 1.5 | ENGAGE ™ 8003 | 0.885 | 1 | 1.496 | 1.4 | 20 | 4 | 30 ± 8 | 25 ± 3 |
| 6D83K/20% Engage 8400 (Ex 2) | 6D83K | 2 | 1.5 | ENGAGE ™ 8400 | 0.870 | 30 | 1.485 | 42.0 | 20 | 15 | 34 ± 4 | 30 ± 3 |
| 6D83K/15% Engage 8200 (Ex 3) | 6D83K | 2 | 1.5 | ENGAGE ™ 8200 | 0.870 | 5 | 1.485 | 7.0 | 15 | 15 | 26 ± 2 | 3 ± 1 |
| 6D83K/20% Engage 8100 (Ex 4) | 6D83K | 2 | 1.5 | ENGAGE ™ 8100 | 0.870 | 1 | 1.485 | 1.4 | 20 | 15 | 40 ± 2 | 26 ± 2 |
| 6D83K/15% Engage 7447 | 6D83K | 2 | 1.5 | ENGAGE ™ 7447 | 0.865 | 5 | 1.482 | 7.0 | 15 | 18 | 27 ± 3 | 24 ± 5 |

TABLE 6-continued

| Example | Polypropylene Grade | MFR (dg/min) | n | Modifier Grade | Density (g/cc) | MI (dg/min) | n | Viscosity Ratio | Modifier Load (Wt %) | Δn × 10⁻³ | Gardner Impact, 32° F. (inch-lbs) | Gardner Impact, −20° F. (inch-lbs) |
|---|---|---|---|---|---|---|---|---|---|---|---|---|
| (Ex 5) Polypropylene Control | R751-12N | 12 | 1.5 | — | — | — | — | — | — | — | 0.9 ± 0.8 | 1.0 ± 0.3 |
| R751-12N/20% Engage 8411 (Ex 7) | R751-12N | 12 | 1.5 | ENGAGE ™ 8411 | 0.880 | 18 | 1.492 | 4.2 | 20 | 8 | 26 ± 5 | 27 ± 6 |
| R751-12N/20% Engage 8200 (Ex 10) | R751-12N | 12 | 1.5 | ENGAGE ™ 8200 | 0.870 | 5 | 1.485 | 1.2 | 20 | 15 | 27 ± 20 | 25 ± 10 |
| R751-12N/20% Engage 8401 (Ex 11) | R751-12N | 12 | 1.5 | ENGAGE ™ 8401 | 0.885 | 30 | 1.496 | 7.0 | 20 | 4 | 34 ± 10 | 12 ± 7 |
| Polypropylene Control | R7021-50 RNA | 12 | 1.5 | — | — | — | — | — | — | — | 0.9 ± 0.2 | 0.4 ± 0.2 |
| R7021.50/20% Engage 8401 (Ex 12) | R7021-50 RNA | 50 | 1.5 | ENGAGE ™ 8401 | 0.885 | 30 | 1.496 | 1.7 | 20 | 4 | 30 ± 7 | 3 ± 2 |
| R7021.50/15% Engage 8407 (Ex 13) | R7021-50 RNA | 50 | 1.5 | ENGAGE ™ 8400 | 0.870 | 30 | 1.485 | 1.7 | 15 | 15 | 20 ± 8 | 3 ± 4 |
| R7021.50/15% Engage 8411 (Ex 14) | R7021-50 RNA | 50 | 1.5 | ENGAGE ™ 8411 | 0.880 | 18 | 1.492 | 1.0 | 15 | 8 | 16 ± 5 | 4 ± 3 |
| R7021.50/20% Engage 8411 (Ex 15) | R7021-50 RNA | 50 | 1.5 | ENGAGE ™ 8411 | 0.880 | 18 | 1.492 | 1.0 | 20 | 8 | 31 ± 10 | 14 ± 4 |

FIGS. 2A-2D are TEM micrographs showing elongated elastomer particles. These TEM micrographs are cut from a plaque made from Example 13. The flow direction of the polymer melt during injection molding is shown by the arrow.

Figure 3A:
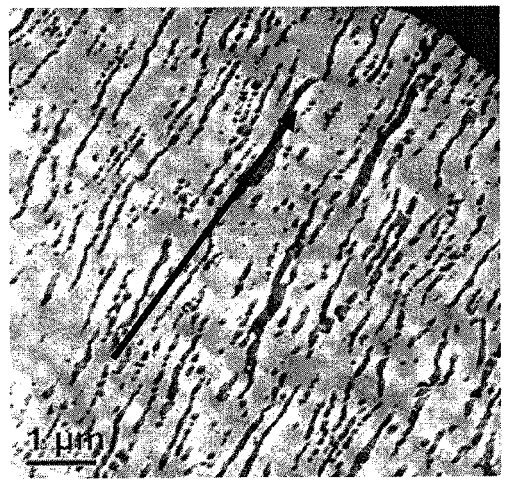
FIGS. 3A-B are TEM micrographs of a molded article in accordance with an embodiment of the present disclosure.
Figure 3B:
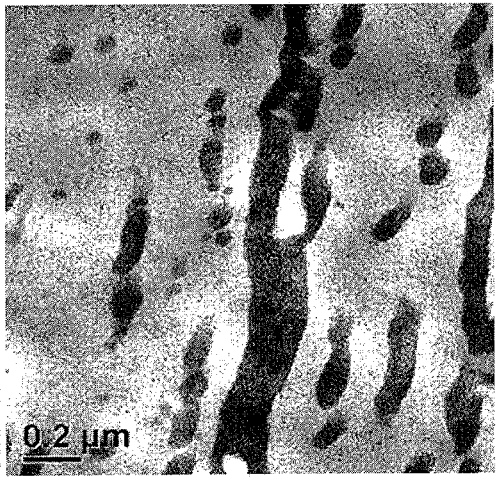

FIGS. 3A-B are TEM micrographs showing elongated elastomer particles. These TEM micrographs are cut from a plaque made from Example 7. The flow direction of the polymer melt during injection molding is shown by the arrow.

Figure 4A:
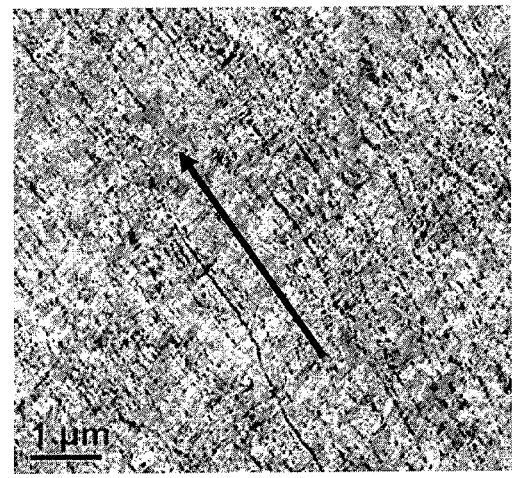
FIGS. 4A-B are TEM micrographs of a molded article in accordance with an embodiment of the present disclosure.
Figure 4B:
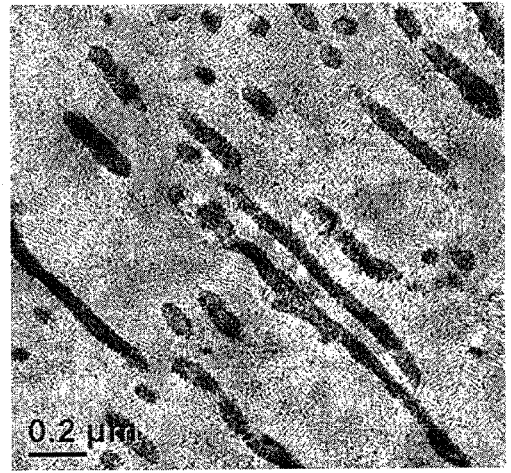

FIGS. 4A-4B are TEM micrographs showing elongated elastomer particles. These TEM micrographs are cut from Example 3. The flow direction of the polymer melt during injection molding is shown by the arrow.

Figure 5A:
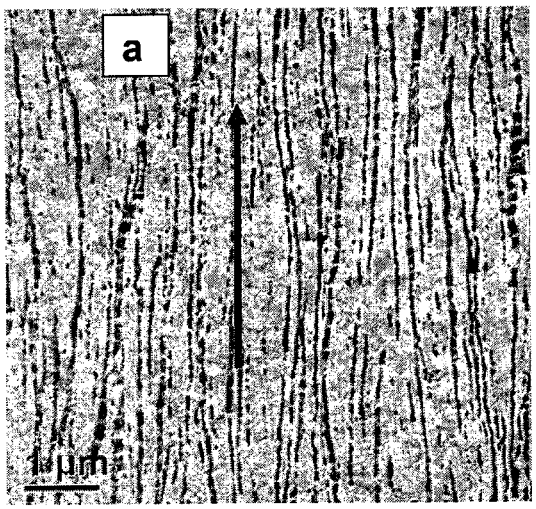
FIGS. 5A-B are TEM micrographs of a molded article in accordance with an embodiment of the present disclosure.
Figure 5B:
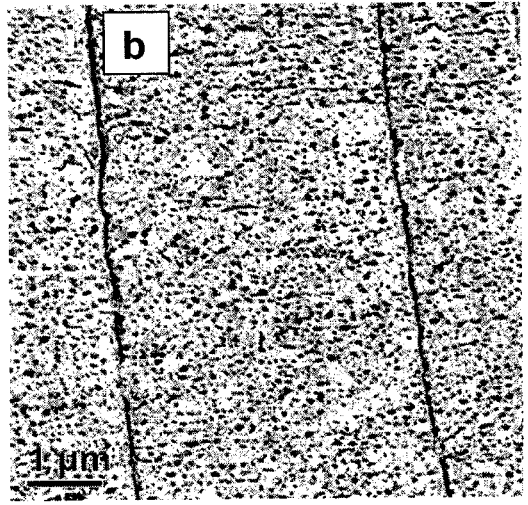

FIGS. 5A-5B are TEM micrographs showing elongated elastomer particles. These TEM micrographs are cut from Example 2. The flow direction of the polymer melt during injection molding is shown by the red arrow in 5A. FIG. 5B is a TEM micrograph of a cross-sectional cut taken normal to the flow direction of the polymer. This image further shows the rod shape of the elongated elastomer particles.

Figure 6A:
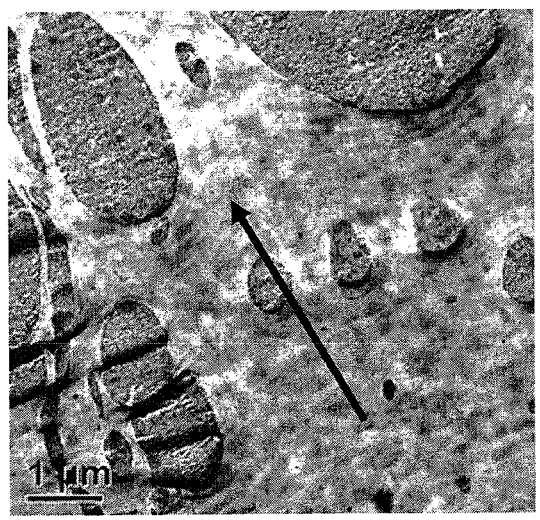
FIGS. 6A-B are TEM micrographs of a molded article composed of a discontinuous phase dispersed in a continuous phase.
Figure 6B:
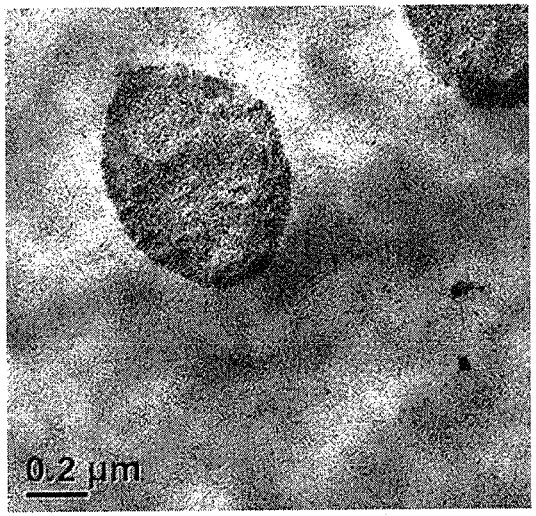

FIGS. 6A-6B are TEM micrographs of Comparative Sample 7. The particles in this sample are spherical. The spherical particles scatter light, and the comparative sample is hazy.

It is specifically intended that the present invention not be limited to the embodiments and illustrations contained herein, but include modified forms of those embodiments including portions of the embodiments and combinations of elements of different embodiments as come within the scope of the following claims.

We claim:

1. A process comprising:

selecting from 80 wt % to 90 wt % of a propylene-based polymer having a refractive index (n1) from 1.495 to 1.505 as measured in accordance with ASTM D 542 and a melt flow rate (MFR) measured in accordance with ASTM D 1238 230° C./2.161kg and 20 wt% to 10 wt% of an elastomer that is an ethylene-based polymer consisting of (i) a majority weight percent polymerized ethylene monomer and (ii) polymerized butene comonomer or polymerized octene comonomer, the elastomer having a refractive index (n2) from 1.470 to 1.497 as measured in accordance with ASTM D 542 and a molt index (MI) measured in accordance with ASTM D 1238 190°C./2.16kg, such that $$\frac{MI \times 2.8}{MFR}$$

is greater than 1.0 to 7.0 and

|n1−n2| is from greater than or equal to 0.015 to 0.025;

blending particles of the elastomer into a matrix of the propylene-based polymer;

subjecting the blend to a shear rate from 8,000 sec⁻¹ to 12,000 sec⁻¹ to form elongated particles of the elastomer particles; and injecting the blend into a mold to form an injection molded article having a haze value less than 15% as measured in accordance with ASTM D 1003.

2. The process of claim 1 wherein the elongated elastomer particles have an average length at least 10 times the average particle width.

3. An injected molded article comprising:
a polymeric composition comprising about 80 wt% to 90 wt% of a matrix of a propylene-based polymer with a refractive index (n1) from 1,495 to 1,505 and a melt flow rate (MFR) measured in accordance with ASTM D 1238, 230°C./2.16 kg;
from 20 wt % to 10 wt % of elongated elastomer particles dispersed in the propylene-basal polymer, the elastomer is an ethylene-based polymer consisting of (i) a majority weight percent polymerized ethylene monomer and (ii) polymerized butene comonomer or polymerized octene comonomer, the elastomer having a refractive index (n2) from 1.470 to 1.497 and a melt index (MI) measured in accordance with ASTM D 1238 190° C./2.16 kg dispersed on the propylene-based polymer;
wherein |n1−n2| is from greater than or equal to 0.015 to 0.025, and the injected molded article has a haze value less than 15% as measured in accordance with ASTM D 1003 and a viscosity ratio (VR) greater than 1.0 to 7.0 wherein $$VR = \frac{MI \times 2.8}{MFR}.$$

4. The injected molded article of claim 3 wherein the elongated elastomer particles have an average length at least 10 times the average particle width from a sectional view taken along a mold flowpath of the article.

5. The injected molded article of claim 3 wherein the elongated elastomer particles have an average width from 5 nm to 200 nm.

6. The injected molded article of claim 3 wherein the propylene-based polymer is a nucleated random propylene/ethylene copolymer.

7. The injected molded article of claim 3 having a haze value loss than 10%.

8. The injected molded article of claim 3 having a clarity value greater than or equal to 98% as measured in accordance with ASTM D 1746.

* * * * *